United States Patent
Doerner et al.

(12)

(10) Patent No.: US 6,567,236 B1
(45) Date of Patent: May 20, 2003

(54) ANTIFERROMAGNETICALLY COUPLED THIN FILMS FOR MAGNETIC RECORDING

(75) Inventors: Mary Frances Doerner, Santa Cruz, CA (US); Eric E. Fullerton, Morgan Hill, CA (US); David T. Margulies, Gilroy, CA (US); Kai Tang, San Jose, CA (US)

(73) Assignee: International Business Machnes Corporation, Armonk, NY (US)

( * ) Notice: Subject to any disclaimer, the term of this patent is extended or adjusted under 35 U.S.C. 154(b) by 0 days.

(21) Appl. No.: 10/010,785

(22) Filed: Nov. 9, 2001

(51) Int. Cl.[7] .......................... G11B 5/66; G11B 5/012; B05D 5/12; H01F 1/00
(52) U.S. Cl. ............................. 360/97.01; 428/694 TS; 428/694 TM; 428/212; 428/216; 428/611; 428/666; 428/668; 428/900; 427/128; 427/131
(58) Field of Search .................. 428/694 TM, 900, 428/694 TS, 216, 212, 666, 668, 611; 427/128, 131; 360/97.01

(56) References Cited

U.S. PATENT DOCUMENTS

| | | | |
|---|---|---|---|
| 5,341,261 A | 8/1994 | Dieny et al. | 360/113 |
| 5,462,796 A | 10/1995 | Teng et al. | 428/336 |
| 6,280,813 B1 | 8/2001 | Carey et al. | 428/65.3 |

OTHER PUBLICATIONS

Abarra et al., "Longitudinal MAgnetic Recording Media with Thermal Stabilization", IEEE International Magnetics Conference, Apr. 2000.*

* cited by examiner

Primary Examiner—Holly Rickman
(74) Attorney, Agent, or Firm—G. Marlin Knight

(57) ABSTRACT

An antiferromagnetically coupled layer structure for magnetic recording wherein the top ferromagnetic structure is a bilayer structure including a relatively thin first sublayer of ferromagnetic material in contact with the coupling/spacer layer. The first sublayer has a higher magnetic moment than the second sublayer. The layer structure of the invention results improved manufacturability and improved performance. A preferred embodiment of a layer structure according to the invention includes: a bottom ferromagnetic layer preferably of CoCr; an antiferromagnetic coupling/spacer layer preferably of Ru; and a top ferromagnetic structure including a thin first sublayer of material preferably of CoCr, CoCrB or CoPtCrB, and a thicker second sublayer of material preferably of CoPtCrB with a lower moment than the first sublayer.

23 Claims, 4 Drawing Sheets

ANTIFERROMAGNETICALLY COUPLED THIN FILMS FOR MAGNETIC RECORDING

FIELD OF THE INVENTION

The invention relates to magnetic thin film media with antiferromagnetically coupled ferromagnetic layers and more particularly to materials used for the plurality of thin films in such media.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 includes substrate 26 of glass or AlMg with an electroless coating of $Ni_3P$ that has been highly polished. The thin films 21 on the disk 16 typically include a chromium or chromium alloy underlayer and at least one ferromagnetic layer based on various alloys of cobalt. For example, a commonly used alloy is CoPtCr. Additional elements such as tantalum and boron are often used in the magnetic alloy. A protective overcoat layer is used to improve wearability and corrosion resistance. Various seed layers, multiple underlayers and laminated magnetic films have all been described in the prior art. The laminated magnetic films have included multiple ferromagnetic layers that are ferromagnetically coupled and more recently antiferromagnetic coupling has been proposed. Seed layers have been suggested for use with nonmetallic substrate materials such as glass. Typically the seed layer is a relatively thin layer which is the first crystalline film deposited in the structure and is followed by the underlayer. Materials proposed for use as seed layers include chromium, titanium, tantalum, MgO, tungsten, CrTi, FeAl, NiAl and RuAl. The use of pre-seed layers 31 is relatively recent practice. The pre-seed layer is a noncrystalline thin film which provides a base for growing the subsequent crystalline films that is superior to the substrate for this purpose. It is known that substantially improved SNR can be achieved by the use of a laminated magnetic layer of two (or more) separate magnetic layers that are separated by a nonmagnetic spacer layer. The reduced media noise is believed due to reduced exchange coupling between the magnetic layers. The use of lamination for noise reduction has been extensively studied to find the favorable spacer layer materials, including Cr, CrV, Mo and Ru, and spacer thicknesses, from a few Angstroms upward, that result in the best decoupling of the magnetic layers and the lowest media noise.

In U.S. Pat. No. 6,280,813 to Carey, et al. (which is commonly assigned with the present application) a layer structure is described that includes at least two ferromagnetic films antiferromagnetically coupled together across a nonferromagnetic coupling/spacer film. In general, it is said that the exchange coupling oscillates from ferromagnetic to antiferromagnetic with increasing coupling/spacer film thickness and that the preferred 6 Angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product (Mrt) of the recording layer is the difference in the Mrt values of the two ferromagnetic films. This reduction in Mrt is accomplished without a reduction in the thermal stability of the recording medium because the volumes of the grains in the antiferromagnetically coupled films add constructively. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater Mrt than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers. The patent mentions, but does not elaborate on the use CoCr interface layers.

SUMMARY OF THE INVENTION

The applicants disclose an antiferromagnetically coupled layer structure for magnetic recording wherein the top ferromagnetic structure is a bilayer structure including a relatively thin first sublayer of ferromagnetic material in contact with the coupling/spacer layer. The first sublayer has a higher magnetic moment than the second sublayer. The second sublayer has a lower magnetic moment and is much thicker than the first sublayer with a composition and thickness selected to provide the Mrt when combined with first sublayer that is needed for the overall magnetic structure. The layer structure of the invention results improved manufacturability and improved performance. A preferred embodiment of a layer structure according to the invention is:

- a pre-seed layer preferably of CrTi
- a seed layer preferably of RuAl;
- an underlayer preferably of CrTi;
- a bottom ferromagnetic layer preferably of CoCr;
- an antiferromagnetic coupling/spacer layer preferably of Ru; and
- a top ferromagnetic structure including:
  - a thin first sublayer of material preferably of CoCr, CoCrB or CoPtCrB, and
  - a thicker second sublayer of material preferably of CoPtCrB with a lower moment than the first sublayer.

DETAILED DESCRIPTION OF THE INVENTION AND THE PREFERRED EMBODIMENTS

Figure 1:
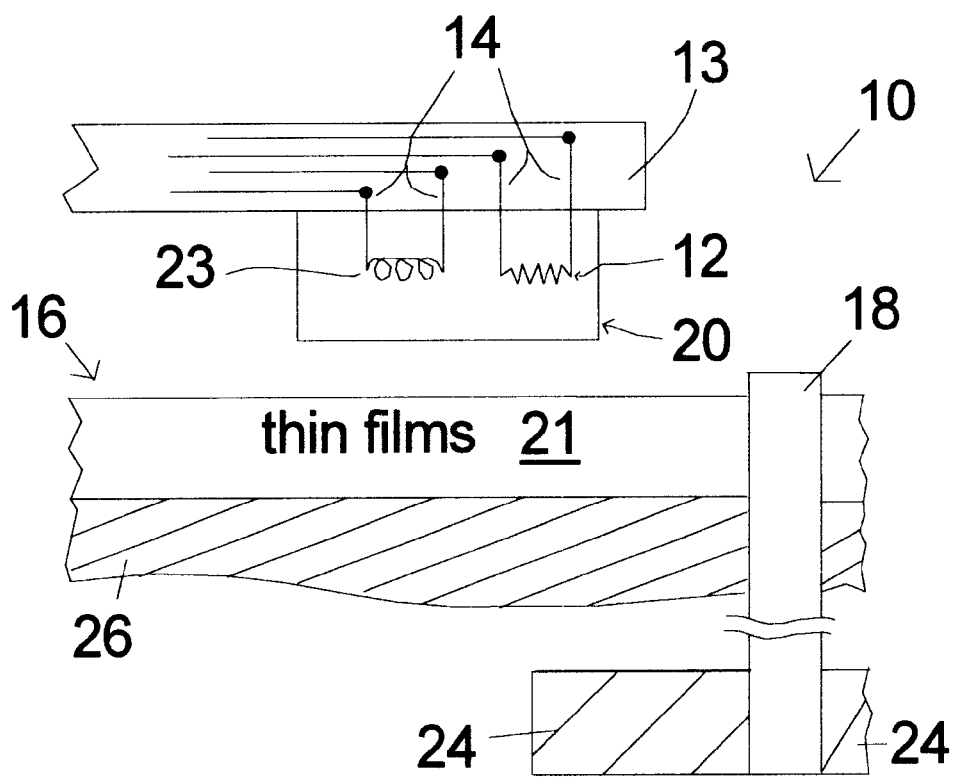
FIG. 1 is a symbolic illustration of the prior art showing the relationships between the head and associated components in a disk drive.
Figure 2:
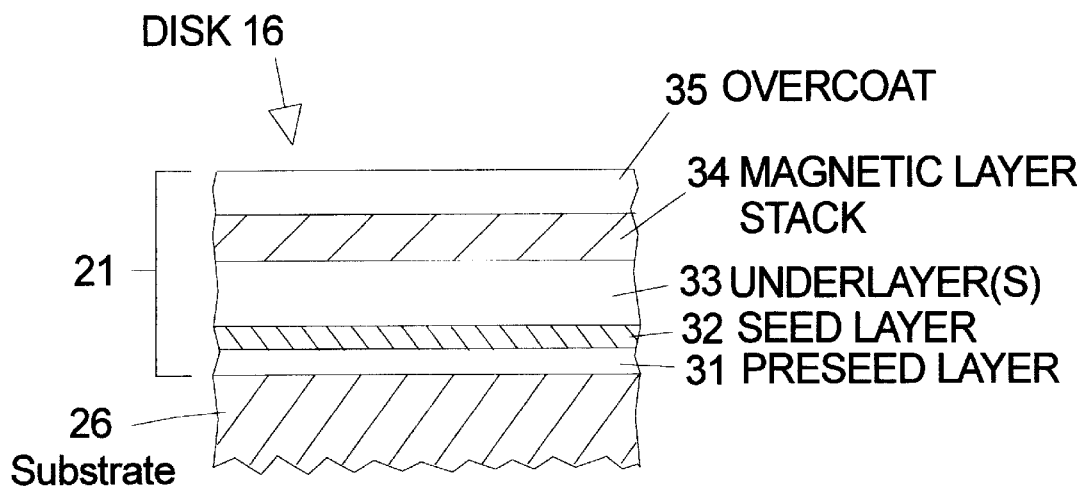
FIG. 2 is an illustration of a layer structure for a magnetic thin film disk according to the invention.

FIG. 2 illustrates the layer structure 21 of a thin film magnetic disk 16 according to the invention. The layers under the underlayer 33 may be any of several combinations of seed layers 32 and pre-seed layers 31 as noted in more detail below. The applicants' most preferred structure includes a pre-seed layer of $CrTi_{50}$, a seed layer of RuAl (B2 crystal structure) and a $CrTi_{10}$ underlayer. The substrate 26 can be any prior art substrate material with glass being preferred.

Figure 3:
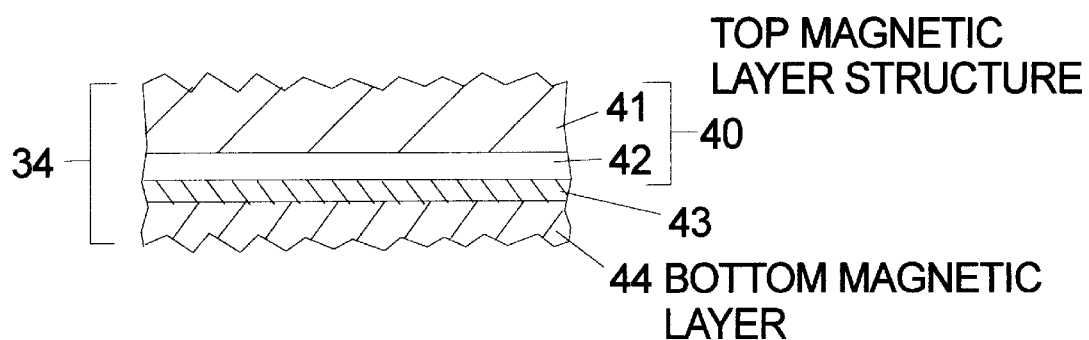
FIG. 3 is an illustration of a magnetic layer stack including a bilayer upper ferromagnetic layer structure for a magnetic thin film disk according to the invention.

The magnetic layer stack 34 is composed of a plurality of layers which are further illustrated in FIG. 3. A magnetic layer stack 34 according to the invention has at least four distinct layers. The bottom magnetic layer 44 is a ferromagnetic material of the type used in the prior art of thin film disks. Co-pending application bearing Ser. No. 09/631,908 filed Aug. 4, 2000 allowed and which is commonly assigned with the present application describes considerations in selecting the material for the bottom magnetic layer 34. Examples of materials suitable for bottom magnetic layer 44 include CoCr, CoPtCr and CoPtCrB with CoCr being preferred by the applicants with 10 to 14 at. % chromium. The thickness of the bottom magnetic layer 44 must be chosen in relation to the thickness of the top magnetic layer structure 40 as indicated above, but 10–30 Angstroms is a preferred range. The coupling/spacer layer 43 is a nonmagnetic material with a thickness that is selected to antiferromagnetically couple the top magnetic layer structure 40 with the bottom magnetic layer 44. Ruthenium is the preferred material for the coupling/spacer layer 43, but the prior art indicates that suitable materials include chromium (Cr), rhodium (Rh), iridium (Ir), copper (Cu), and their alloys. The thickness of the exchange/spacer layer 43 is according to the prior art; for example, approximately 6 Angstroms is a preferred target thickness for a ruthenium coupling/spacer layer 43. The top magnetic layer structure 40 according to the invention is a bilayer structure including two distinct ferromagnetic materials. The interface (first) sublayer 42 is a thin layer of material with a relatively high moment, that is, a moment higher than the second sublayer. The preferred materials for the interface sublayer 42 are CoCr, CoCrB and CoPtCrB. The preferred thickness is approximately 3–15 Angstroms. The interface sublayer material is selected to have a higher magnetic moment than the second sublayer. As is known in the art, the moment of the cobalt alloys is decreased in varying degrees by the amounts of the alloying elements, e.g., platinum, chromium and boron, that are included. Therefore, even though the first and second sublayers may contain the same elements, the atomic percentages will be different to achieve the goal of a higher moment in the first sublayer.

The second sublayer has a lower magnetic moment and is also much thicker than the first sublayer with a composition and thickness selected to provide the Mrt when combined with first sublayer that is needed for the overall magnetic structure. The top ferromagnetic layer structure, i.e., the first and second sublayer, is designed to have a greater Mrt than the bottom ferromagnetic layer, so that the net moment in zero applied magnetic field is low, but nonzero.

The layer structure of the invention results in improved manufacturability and improved performance. Unlike some prior art designs which required an interface layer on each side of exchange/spacer layer, the applicants' design uses only one interface sublayer which results in a simplification of the manufacturing process. The interface sublayer of the invention also improves the SNR by lowering the intergranular exchange in the top magnetic layer structure in comparison to that obtained with a cobalt interface layer. This in turn allows interface sublayer of the invention to be somewhat thicker than a cobalt interface sublayer. As extremely thin as the interface sublayer must be, a wider tolerance in thickness is an improvement in manufacturability.

Figure 4:
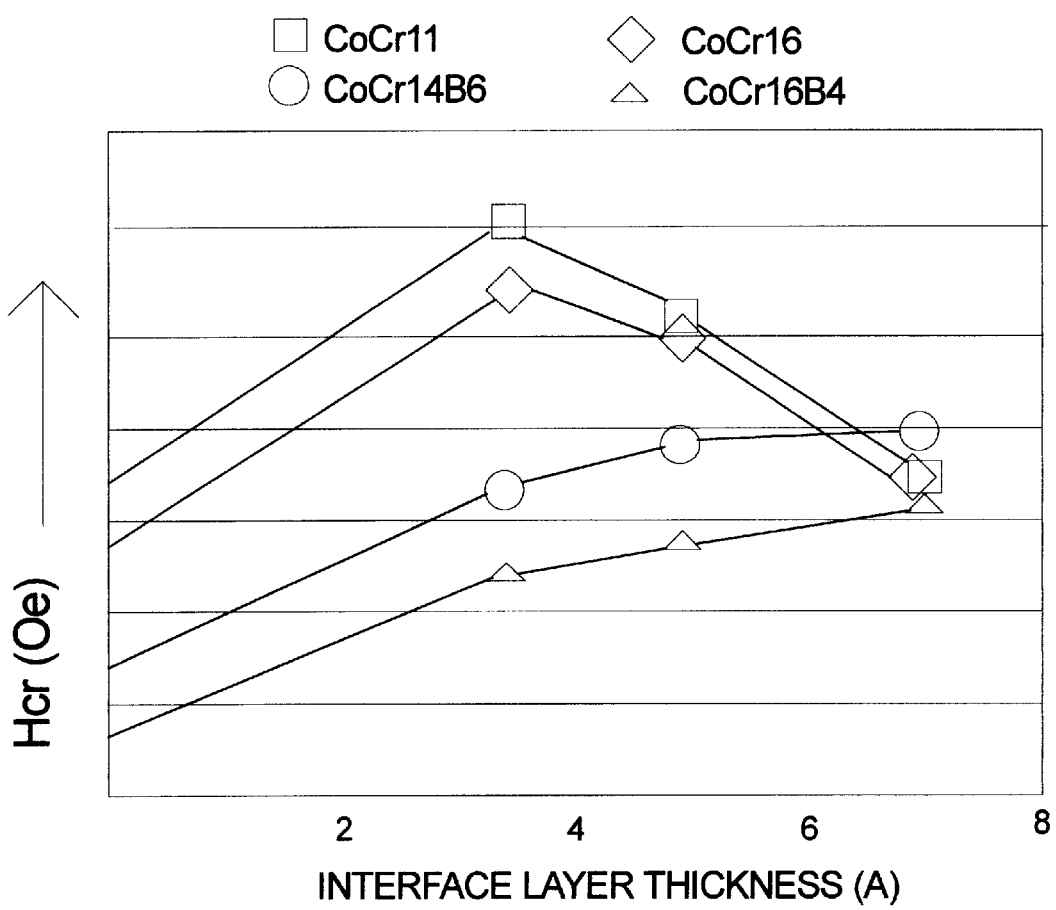
FIG. 4 is a graph of coercivity (Hcr) versus interface sublayer thickness for four different cobalt alloys used experimentally in thin film structures according to the invention.
Figure 5:
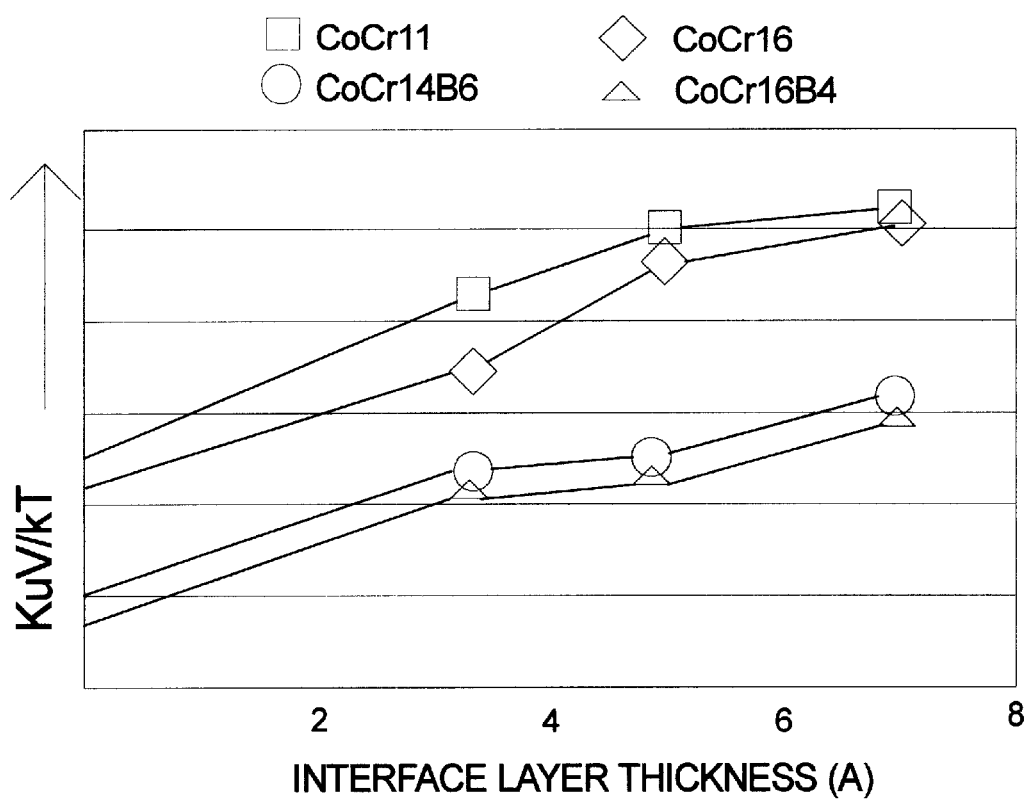
FIG. 5 is a graph of KuV/kT versus interface sublayer thickness for four different cobalt alloys used experimentally in thin film structures according to the invention.

FIG. 4 is a graph of coercivity (Hcr) versus interface sublayer thickness for four different cobalt alloys used experimentally in thin film structures according to the invention. The magnetic layer stack for each of the samples included a bottom magnetic layer of either CoCr11 or CoCr14, a coupling/spacer layer of ruthenium and a top magnetic layer of CoPt12Cr19B8. The absolute values of coercivity of the magnetic layer stacks varied somewhat between the base films, but the trend according to the thickness of the interface sublayer is the significant aspect of the data. The four compositions of interface sublayers used in the experiment were CoCr11, CoCr16, CoCr14B6 and CoCr16B4. The coercivity of each of the test samples was increased by the inclusion of the interface sublayer. The CoCr interface sublayers increased the coercivity the most at a thickness of between 3 and 4 Angstroms, with less improvement with increased thickness. The CoCrB interface sublayers showed a more constant contribution from about 3 Angstroms to 7 Angstroms in thickness. Therefore, the CoCrB interface sublayers would allow a wider range of thicknesses to be used in manufacturing process control, but the CoCr alloys provide a stronger effect under optimum conditions. FIG. 5 is a graph of the thermal stability parameter KuV/kT versus interface sublayer thickness for the four different cobalt alloy interface sublayers discussed above. The graph shows that KuV/kT was increased significantly with each alloy even at a thickness between 3 and 4 Angstroms. Although not shown in the data in FIGS. 4 and 5, CoPtCrB with a composition in the ranges listed below is also a suitable material for the interface sublayer.

The preferred material for second sublayer magt film 41 is CoPtCrB which is generally described in the U.S. Pat. No. 5,52,173 chreded to Doerner, et al. The preferred magnetic layer composition in atomic percent is $CoPt_xCr_yB_z$ where:

10<x<16;

14<y<20;and

6<z<12.

The optimum platinum percentage (x) depends on the desired coercivity for the application.

The thin film structure of the invention is intended for use as a longitudinal recording medium. For longitudinal magnetic recording the preferred orientation of the grains should be one of the two c-axis in-plane orientations with the [10$\bar{1}$0] or [11$\bar{2}$0] planes parallel to the surface. Cobalt alloy magnetic films may be grown with the preferred orientations of (10$\bar{1}$0) or (11$\bar{2}$0) by first depositing an underlayer with a (112) or (200) preferred orientations respectively. Co-pending, commonly assigned U.S. patent applications bearing Ser. No. 09/295,267 pending and Ser. No. 09/547,439 pending describe the use of a RuAl seed layer with a B2 crystallographic structure to obtain an underlayer with a preferred in-plane orientation of (200) and a cobalt alloy magnetic film with the preferred in-plane orientation of (11$\overline{2}$0). Therefore, the embodiments of the thin film structure of the invention that include RuAl as the seed layer will result in a preferred orientation of (11$\overline{2}$0). Co-pending, commonly assigned U.S. patent application bearing Ser. No. 09/500,710 pending describes the use of an amorphous or nanocrystalline CrTa or AlTi as a pre-seed layer, sputter deposited onto a nonmetallic substrate, such as glass, followed by a RuAl seed layer with B2 structure. As stated in the referenced application, a CrTa or AlTi pre-seed layer may also be used effectively with a RuAl seed layer to obtain smaller overall grain size, as well as, a reduction in manufacturing costs by saving on the relatively high cost of ruthenium. The resulting increased coercivity also allows use of a thinner Cr alloy underlayer which also contributes to decreased grain size. The use of a pre-seed layer of CrTa or AlTi improves grain size, grain distribution, in-plane crystallographic orientation, coercivity and SNR.

A CrTi pre-seed layer, which is preferred over CrTa or AlTi, also allows the use of a thinner RuAl seed layer to reduce the overall grain size, as well as, manufacturing costs from reduced use of ruthenium. The use of the CrTi pre-seed layer increases coercivity which then allows use of a thinner Cr alloy underlayer contributing to decreased grain size. As in the case of the CrTa and AlTi pre-seed layers, the use of a pre-seed layer of CrTi improves grain size, grain distribution, in-plane crystallographic orientation, coercivity and SNR. In addition to providing excellent magnetic and recording performance, the CrTi pre-seed layer improves the mechanical properties. Specifically the adhesion of the thin films to the glass surface is increased and the resistance to scratching is improved. The preferred thickness for the CrTi pre-seed layer is from 10 nm to 100 nm. The preferred compositional range is from 35 at. % to 55 at. % titanium.

The thin film structures described above can be formed using standard sputtering techniques. The films are sequentially sputter deposited with each film being deposited on the previous film. The atomic percent compositions given above are given without regard for the small amounts of contamination that invariably exist in sputtered thin films as is well known to those skilled in the art.

The invention has been described with respect to particular embodiments, but other uses and applications for the bilayer ferromagnetic structure according to the invention will be apparent to those skilled in the art.

What is claimed is:

1. A thin film magnetic recording medium comprising:
   an underlayer;
   a bottom ferromagnetic layer deposited on the underlayer;
   a nonmagnetic coupling/spacer layer adjacent to the bottom ferromagnetic layer;
   a first sublayer of ferromagnetic CoCrB or CoPtCrB adjacent to the coupling/spacer layer, the first sublayer having a first thickness and a first moment; and
   a second sublayer of ferromagnetic material with a second moment and a second thickness with the second moment being lower than the first moment and the second thickness being greater than the first thickness, and the first and second sublayers of ferromagnetic material being antiferromagnetically coupled to the bottom ferromagnetic layer.

2. The thin film magnetic recording medium of claim 1 wherein the second sublayer of ferromagnetic material comprises CoPtCrB.

3. The thin film magnetic recording medium of claim 1 further comprising a seed layer of RuAl deposited prior to the underlayer and wherein the underlayer is adjacent to the seed layer.

4. The thin film magnetic recording medium of claim 3 further comprising a pre-seed layer deposited prior to the seed layer and wherein the seed layer is adjacent to the pre-seed layer.

5. The thin film magnetic recording medium of claim 4 wherein the pre-seed layer is CrTa or AlTi.

6. The thin film magnetic recording medium of claim 4 wherein the pre-seed layer is CrTi.

7. The thin film magnetic recording medium of claim 3 wherein the underlayer includes CrTi.

8. The thin film magnetic recording medium of claim 1 wherein the bottom magnetic layer is CoCr.

9. The thin film magnetic recording medium of claim 8 wherein the nonmagnetic coupling/spacer layer is ruthenium.

10. The thin film magnetic recording medium of claim 9 wherein the second sublayer of ferromagnetic material includes CoPtCrB.

11. A thin film magnetic recording medium comprising:
    a pre-seed layer of CrTi;
    a seed layer of RuAl deposited on the pre-seed layer;
    an underlayer of CrTi deposited on the seed layer;
    a bottom ferromagnetic layer of CoCr deposited on the underlayer;
    a nonmagnetic coupling/spacer layer of Ru adjacent to the bottom ferromagnetic layer;
    a first sublayer of ferromagnetic CoCr, CoCrB or CoPtCrB adjacent to the coupling/spacer layer, the first sublayer having a first thickness and a first moment; and
    a second sublayer of ferromagnetic CoPtCrB with a second moment and a second thickness with the second moment being lower than the first moment and the second thickness being greater than the first thickness, and the first and second sublayers being antiferromagnetically coupled to the bottom ferromagnetic layer.

12. A method of fabricating a magnetic thin film storage medium comprising the steps of:
    depositing an underlayer of a chromium alloy;
    depositing a bottom ferromagnetic layer of a cobalt alloy on the underlayer;
    depositing a nonmagnetic coupling/spacer layer on the bottom ferromagnetic layer;
    depositing a first sublayer of ferromagnetic CoCrB or CoPtCrB on the coupling/spacer layer, the first sublayer having a first thickness and a first moment; and
    depositing a second sublayer of ferromagnetic material with a second moment and a second thickness with the second moment being lower than the first moment and the second thickness being greater than the first thickness, and the first and second sublayers of ferromagnetic material being antiferromagnetically coupled to the bottom ferromagnetic layer.

13. The method of claim 12 wherein the second sublayer of ferromagnetic material comprises CoPtCrB.

14. The method claim 12 further comprising the step of depositing a seed layer of RuAl deposited prior to the step of depositing the underlayer and wherein the underlayer is deposited on the seed layer.

15. The method of claim 14 further comprising the step of depositing a pre-seed layer of CrTi, CrTa or AlTi prior to the seed layer and wherein the seed layer is deposited on the pre-seed layer.

16. The method of claim 12 wherein the bottom magnetic layer is CoCr.

17. The method of claim 16 wherein the nonmagnetic coupling/spacer layer is ruthenium.

18. The method of claim 17 wherein the second sublayer of ferromagnetic material includes CoPtCrB.

19. A disk drive comprising:
   a magnetic transducer including a read and a write head;
   a spindle; and
   a magnetic thin film disk mounted on the spindle, the magnetic thin film disk including:
      a bottom ferromagnetic layer deposited on the underlayer;
      a nonmagnetic coupling/spacer layer adjacent to the bottom ferromagnetic layer;
      a first sublayer of ferromagnetic CoCrB or CoPtCrB adjacent to the coupling/spacer layer, the first sublayer having a first thickness and a first moment; and
      a second sublayer of ferromagnetic material with a second moment and a second thickness with the second moment being lower than the first moment and the second thickness being greater than the first thickness, and the first and second sublayers being antiferromagnetically coupled to the bottom ferromagnetic layer.

20. The disk drive of claim 19 wherein the bottom ferromagnetic layer is CoCr.

21. The disk drive of claim 19 wherein the second sublayer is CoPtCrB.

22. The disk drive of claim 19 wherein the magnetic thin film disk further comprises a seed layer of RuAl under the underlayer.

23. The disk drive of claim 22 wherein the magnetic thin film disk further comprises a pre-seed layer of CrTi under the seed layer.

* * * * *